Oct. 24, 1944.　　　L. C. ROBISON　　　2,360,980
BROACH PULL
Filed Nov. 27, 1943
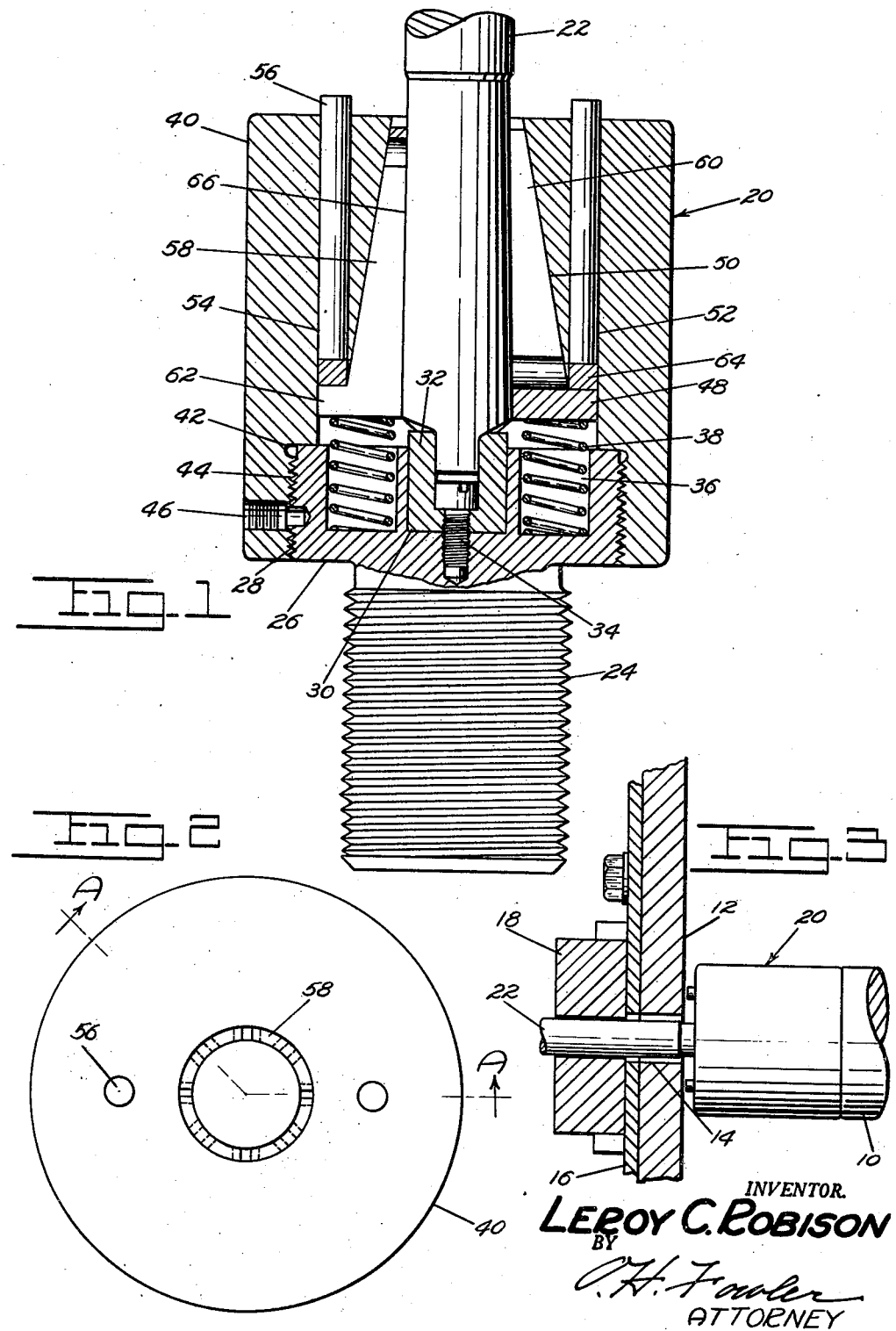
INVENTOR.
LEROY C. ROBISON
BY
C. H. Fowler
ATTORNEY Patented Oct. 24, 1944

2,360,980

UNITED STATES PATENT OFFICE 2,360,980

BROACH PULL

Leroy C. Robison, Detroit, Mich., assignor to Sturdy Tool and Engineering Company, Detroit, Mich., a partnership Application November 27, 1943, Serial No. 511,967

5 Claims. (Cl. 90—33)

This invention relates to broaching machines, and more particularly to broach pulls.

Broadly the invention comprehends a broach pull operative to automatically release the broach upon the conclusion of each operation.

An object of the invention is to provide a highly efficient broach pull of extremely simple character.

Another object of the invention is to provide a broach pull having but few parts requiring a minimum amount of machine work in manufacture thereof and greatly facilitating in assembly.

Yet another object of the invention is to provide a broach pull of durable character, of simple structure and efficient in operation.

The above and other objects and features will appear more fully hereinafter from the following detailed description when taken in conjunction with the accompanying drawing forming a part of this specification, and in which, Fig. 1 is a sectional view of the broach pull taken on line A—A, Fig. 2;

Fig. 2 is a top plan view of the broach pull; and

Fig. 3 is a diagrammatic illustration of an assembly including the head of a broaching machine, the stationary support associated therewith, the broach pull on the head of the machine, a broach in the pull, and work supported in a fixture on the stationary support.

Referring to the drawing for more specific details of the invention, 10 represents the head of a conventional broaching machine. The head is reciprocable, and associated therewith is a stationary support 12 having an opening 14 therethrough. As shown, the stationary support has suitably mounted thereon a fixture 16 for the reception of the work 18.

A broach pull indicated generally at 20 is fixedly secured to the head 20 of the broaching machine, and a broach 22 held in the pull extends through the opening 14 in the stationary support 12 and the work 18 in the fixture on the support.

The broach pull includes a threaded shank 24 adapted to be screwed into the head 10, and the shank supports a concentric head 26 externally threaded as indicated at 28. The head 24 has a centrally disposed bore 30 for the reception of a pilot 32 held against displacement by a machine screw 34 threaded into the shank 24, and arranged in a circle the center of which is in the axis of the head 24 are spaced bores 36 parallel to the axis of the head, and the bores 36 receive compression spring 38.

A sleeve 40 has its internal diameter enlarged at one end thereof to provide a shoulder 42, and that portion of the sleeve having the enlarged diameter is internally threaded as indicated at 44 for the reception of the threads 28 on the head 26. The sleeve 40 is turned down on the head 26 until the shoulder 42 abuts the face of the head, where it is retained against displacement by a set screw 46 extended through the sleeve into the head.

That portion of the sleeve 40 adjacent the head 26 has a uniform internal diameter, as indicated at 48, and from the free end of the sleeve inwardly the internal diameter thereof is gradually increased as indicated at 50, and this tapered portion provides in conjunction with that portion having a uniform diameter an internal shoulder 52. The sleeve 40 has a plurality of spaced bores 54 extended from the face of the sleeve inwardly through the shoulder 52, and thrust pins 56 are mounted for reciprocation in the bores 54.

A collet 58 of the expansible type is fitted for axial movement in the sleeve 26. The collet has a tapered outer circumference 60 complementary to the tapered internal portion 50 of the sleeve, and a circumferential flange 62 supporting a compression ring 64 for the reception of the thrust pins 56.

The collet is seated on the compression springs 38 which serve to advance the collet in the internal tapered portion of the sleeve, and the collet has an internal tapered bore 66 gradually increased in diameter from the outer end thereof inwardly for the reception of the shank of the broach 22.

In practice, the broach pull is fitted on the head 10 of the broaching machine and the head is advanced until the thrust pins 56 engage the back of the stationary support 12. This moves the collet 58 backwardly against the resistance of the springs 58, resulting in expansion of the collet for the reception of the shank of the broach 22. The work is then sleeved on the broach, and the shank of the broach is slipped in the collet, the pilot 32 serving to center the broach. The work is then placed in the fixture 16 and the head 10 advanced on the working stroke.

Upon completion of the working stroke, the head 10 of the machine automatically returns to the position where the thrust pins 56 of the broach pull again engages the stationary support and this results in the transmission of force through the thrust pins and pressure ring to the collet, causing the collet to move backwardly against the resistance of the springs 38, and during this movement of the collet it automatically expands and releases the broach.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. A broach pull comprising a sleeve having a tapered bore in one end thereof, a head in the other end of the sleeve, an expansible collet movable in the bore, springs interposed between the collet and the head urging the collet to seat in the bore, and thrust pins for moving the collet against the resistance of the springs.

2. A broach pull comprising a sleeve having a tapered bore in one end thereof, a head in the other end of the sleeve, a threaded shank on the head, a pilot on the head, an expansible collet movable in the tapered bore, springs interposed between the head and the collet, and thrust pins for moving the collet against the resistance of the springs.

3. A broach pull comprising a sleeve having a tapered bore gradually increasing in diameter from one end of the sleeve inwardly thereof, a head in the other end of the sleeve, a threaded shank on the head, a pilot on the head extended concentrically within the sleeve, an expansible collet movable in the bore, springs on the head urging the collet to seat in the bore, and thrust pins in the wall of the sleeve for moving the collet against the resistance of the springs.

4. A broach pull comprising a sleeve having a bore gradually increasing in diameter from one end of the sleeve inwardly thereof, a head on the other end of the sleeve having a threaded shank, a pilot on the head extended inwardly of the sleeve, an expansible collet having an outer circumference complementary to the bore and a circumferential flange, a pressure ring on the flange, springs urging the collet to seat in the bore, and thrust pins in the wall of the sleeve abutting the pressure ring and adapted to move the collet against the resistance of the springs.

5. In combination with a broaching machine having a reciprocable head and a fixed support, a broach pull on the head of the machine comprising a member having a tapered bore, an expansible collet movable in the bore for the reception of a broach, means for urging the collet to seat in the bore and clasp the broach, and thrust pins for moving the collet to release the broach adapted to abut the fixed support at the end of the return stroke of the head.

L. C. ROBISON.